April 28, 1959 — W. E. SWIFT, JR — 2,884,538
RADIO-ACTIVE GASEOUS GAUGING SOURCE
Filed Jan. 26, 1956 — 4 Sheets-Sheet 1
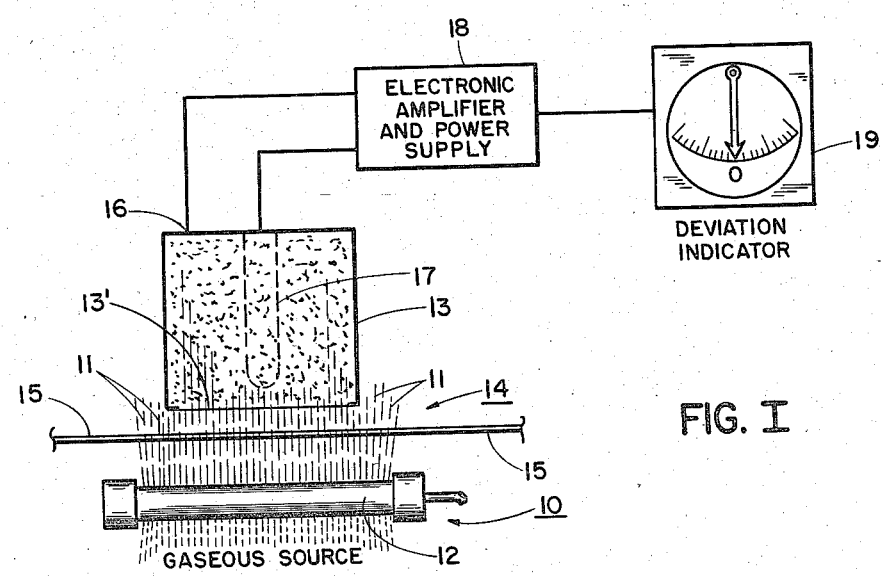
FIG. I
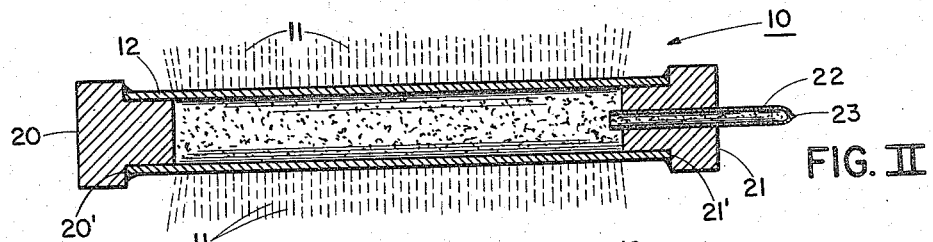
FIG. II
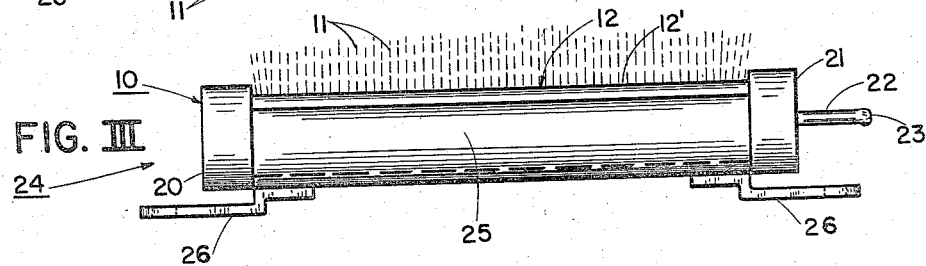
FIG. III
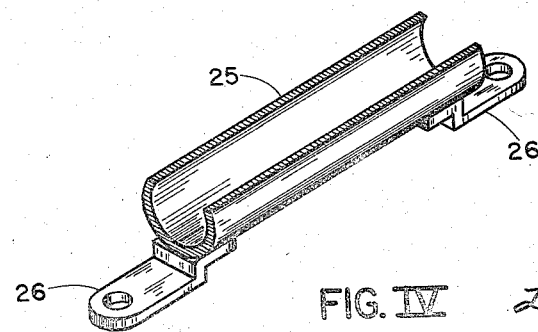
FIG. IV
INVENTOR.
WILLARD EVERETT SWIFT, JR.
BY Lawrence H. Poston
AGENT April 28, 1959   W. E. SWIFT, JR   2,884,538
RADIO-ACTIVE GASEOUS GAUGING SOURCE
Filed Jan. 26, 1956   4 Sheets-Sheet 2
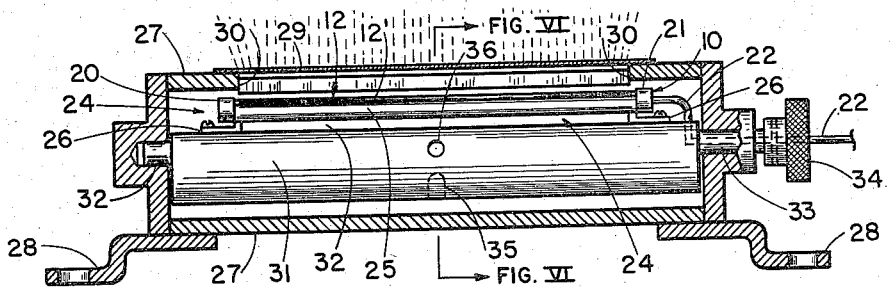
FIG. V
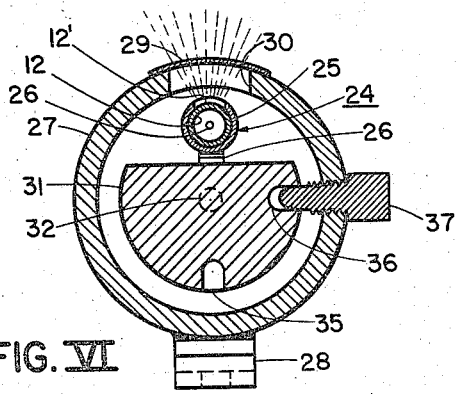
FIG. VI
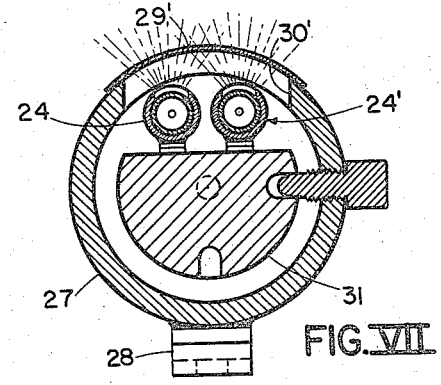
FIG. VII
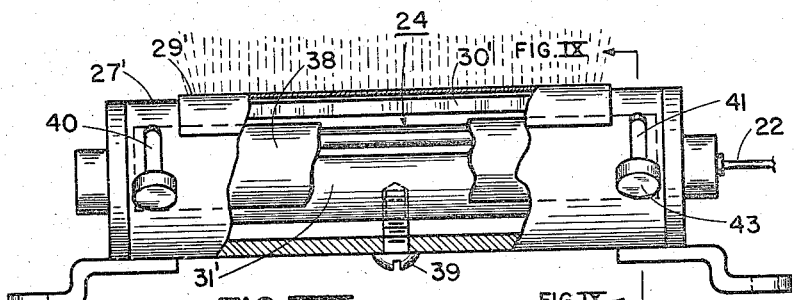
FIG. VIII
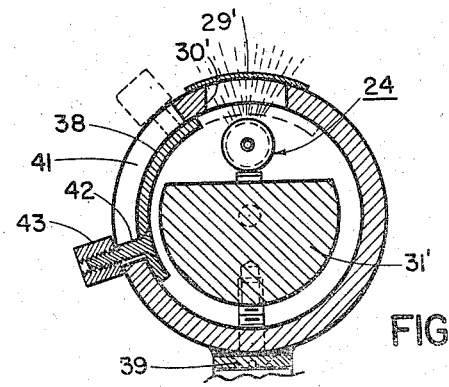
FIG. IX
INVENTOR.
WILLARD EVERETT SWIFT, JR.
BY
Lawrence H. Porter
AGENT

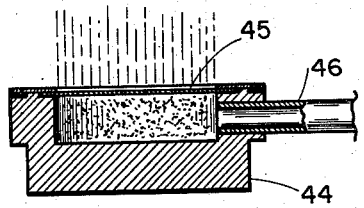
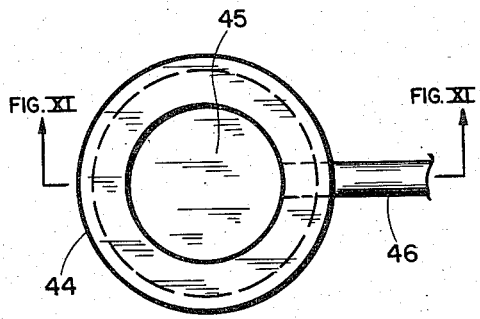
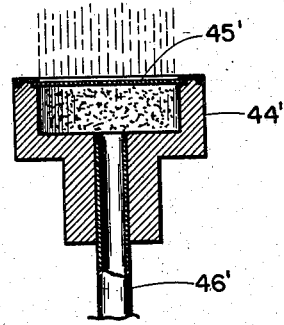
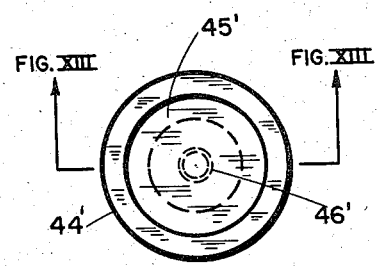
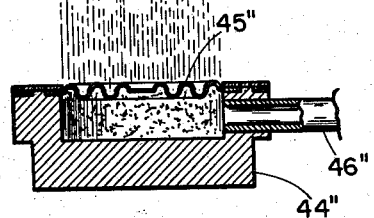
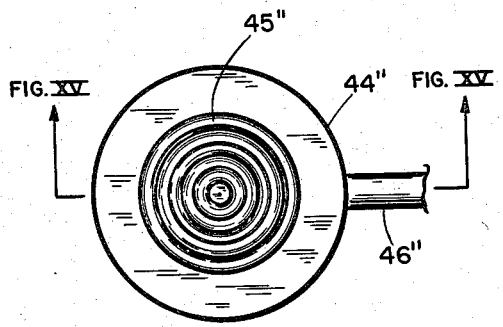

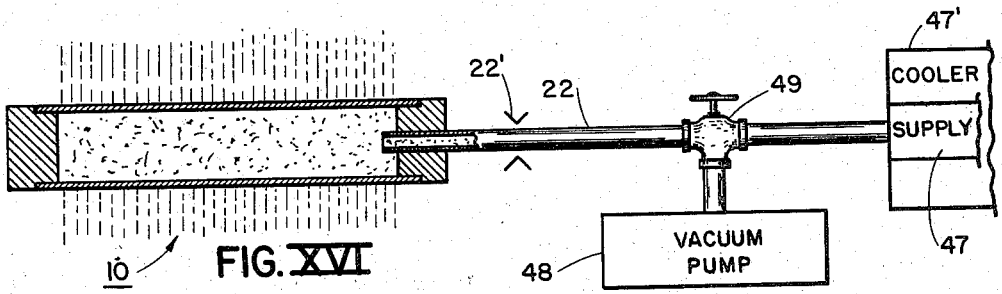
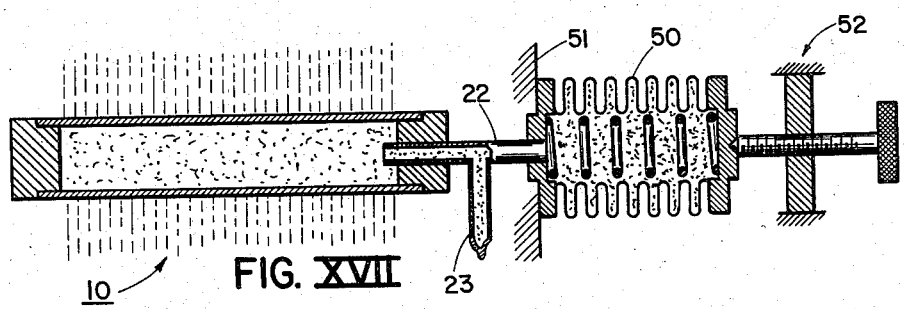
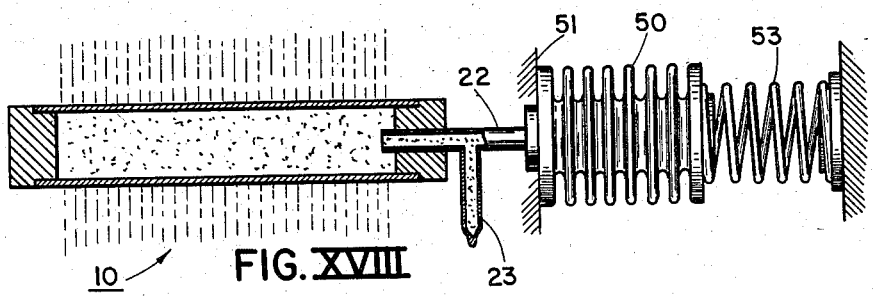
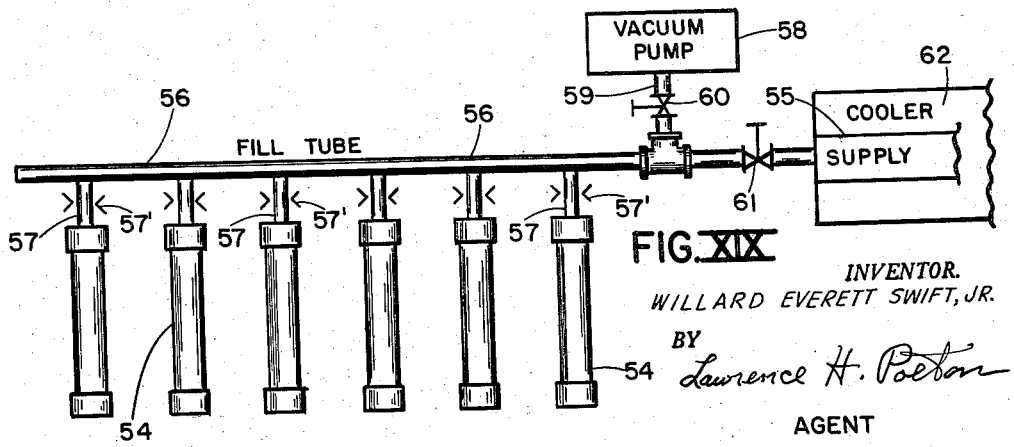

United States Patent Office 2,884,538
Patented Apr. 28, 1959

2,884,538

RADIO-ACTIVE GASEOUS GAUGING SOURCE

Willard Everett Swift, Jr., Sharon, Mass., assignor to The Foxboro Company, Foxboro, Mass., a corporation of Massachusetts Application January 26, 1956, Serial No. 561,520

1 Claim. (Cl. 250—83.6)

This invention relates to gauging systems using an ionization radiation source of the radio-active isotope class, and has particular reference to a source device for such systems. This invention refers particularly to a gaseous source for such systems. In illustration, beta ray emitting krypton 85 is herein designated as such a source.

The gauging source of this invention is intended for use as a part of a gauging system. In one such system ionization radiations from a radio-active source pass through a suitable gap, such as an air gap, into an ionization chamber, with material under test being placed in the air gap. The chamber is polarized and contains air or other suitable gas, for example, argon or a mixture of argon and nitrogen. The gas in the chamber is ionized by the radiation which passes through the material under test and enters the chamber. Thus the degree of ionization of the chamber, and consequently the electrical current through the chamber polarization arrangement, are functions of the radiation absorption factor of the material under test.

Gauging sources of this nature have in the past been in the form of solid bodies charged with radio-active isotopes such as thallium 204 or strontium 90. These bodies were preformed to definite characteristics, essentially unvariable and not easy to precisely duplicate for quantity production purposes. Also, if such bodies were exposed, or their supporting units broken, it could readily occur that solid particles of the radio-active material would be left lying about unnoticed, or lodged in clothing, etc. with consequent possibilities of sustantial harmful effects.

The gauging source according to the present invention has many advantages over prior art devices, and the prior art disadvantages are obviated. The gauging source of this invention is a gaseous radio-active body contained in a housing at least a part of which is arranged as a window permeable to the emissions of the gaseous body. An example is krypton 85 as an emitter of beta rays.

The gaseous source of beta rays according to this invention has numerous advantages. It has a safety factor which lessens the danger of careless handling. A standardized source is available by means of simple adjustment of gas pressure. It provides means for easily obtaining a uniform source over a large area. It is less self-shielding than a solid source. For manufacturing and other purposes it lends itself readily to reproducibility. Radiation permeable windows may be made inexpensively to rough tolerances since the gas density is easily adjusted to match the emission strength of various sources on a reproducibility basis. This gas source is readily variable in emissive strength even while in use. There are substantial indications of advantage in using this gas source from a safety standpoint since rupture of its container would in many cases simply allow the gas to harmlessly diffuse in the surrounding atmosphere. Krypton 85, for example, is a noble gas and therefore does not contaminate other substances except as it may go into solution. Krypton 85, also, has lower energy than the usual solid sources so that a better absorption ratio is available with respect to the gauging of light weight materials. Other important advantages of this invention are that restoration of the source intensity loss, due to the deterioration to half life, is simply and easily accomplished by adding more gas. Also changes in the amount of radiation may be made without changing the pattern or the effective area of the radiation. Further, with the gas source of this invention, a uniform line or strip source is readily obtainable, or a spot or small area source may easily be produced, with reproducible uniformity with respect to a particular line or strip source.

It is, accordingly, an object of this invention to provide an improved radio-active radiation source device.

It is a further object of this invention to provide a radio-active gaseous source for use in a gauging system.

Other objects and advantages of this invention will be in part apparent and in part pointed out hereinafter.

In the drawings:

Figure I is a schematic illustration of a gauging system embodying this invention;

Figure II is a longitudinal, vertical, and transversely central section through the gaseous source unit of Figure I;

Figure III is an elevation of an assembly of the gaseous source unit of Figure I with a radiation shield sleeve member thereon;

Figure IV is a perspective view of the radiation shield sleeve of Figure III;

Figure V is a showing of a gaseous source assembly according to this invention, shown in partial longitudinal, vertical, and transversely central section;

Figure VI is a cross-sectional showing of the whole structure of Figure V, taken on a line located in Figure V at VI—VI;

Figure VII shows an alternate structure like that of Figure V and VI except that a pair of gaseous source units is used;

Figure VIII is an elevation, in partial section, of an alternate structure with respect to the structure of Figures V and VI;

Figure IX is a sectional view of the alternate structure of Figure VIII, taken on line IX—IX of Figure VIII;

Figure X is a plan view of a gaseous spot source according to this invention;

Figure XI is a section of Figure X taken for the most part on line XI—XI of Figure X;

Figure XII is a plan view of an alternate structure spot source;

Figure XIII is a section of Figure XII taken for the most part on line XIII—XIII of Figure XII;

Figure XIV is a plan view of another alternate structure spot source;

Figure XV is a section of Figure XIV taken for the most part on line XV—XV of Figure XIV;

Figure XVI is a schematic illustration of a beta ray source system according to this invention;

Figure XVII is a showing of an alternate structure source system;

Figure XVIII is a showing of another alternate structure source system; and

Figure XIX illustrates a multiple source filling system.

The illustrative embodiment radioactive gauging system as shown in Figure I has therein a gaseous source unit 10, containing gas in the form of krypton 85 which gives off beta rays 11 in all directions. The main body 12 of the unit 10 is a tube of beta ray permeable material such as stainless steel of the order of .001 of an inch in thickness. As ionization chamber 13 is located above the source unit 10, with an air gap 14 therebetween and with a beta ray permeable window 13' in the ionization chamber. A sheet of paper 15 is located in the air gap 14 as a material under test for weight per unit area, and a portion of the beta rays 11 are passed through the paper sheet 15 and into the ionization chamber 13. This chamber is polarized through a supply electrode 16 and a collector electrode 17 in the conventional manner. A standard, or zero, condition is established and a variant in the paper thereafter results in a change in the degree of ionization in the chamber 13. Consequently an electrical signal is applied to an amplifier 18 and the output thereof operates a deviation indicator 19.

Figure II shows the detail of the gaseous source unit of Figure I. It comprises the cylindrically tubular main body 12 of beta ray permeable stainless steel, with the tube ends sealed off by cylindrical plugs 20 and 21 shouldered at 20' and 21' to seat the ends of the tubular body 12. The end plugs 20 and 21 are formed of material such as brass to thickness suitable for endwise shielding of the beta rays from the krypton gas. The right hand end plug 21 has a filler pipe 22 extending therethrough and into the chamber formed by the body 12. The pipe 22 is pinched off at 23 outside of the plug 22 in a sealing arrangement after the unit is charged with krypton 85, through the pipe 22.

In Figure III, the gaseous source unit 10 of Figures I and II is shown in an assembly 24 with a beta ray shield sleeve 25 in the form of a partial cylinder. This assembly thus provides a cylindrical source which is shielded except for a window strip 12' lengthwise along the top thereof. Thus the window in this assembly is a wall strip of the cylindrical main body 12. The shielding sleeve 25 itself is shown in Figure IV, also further showing a pair of bracket feet 26 for mounting the whole assembly on a suitable support.

The beta ray source assembly of Figures V and VI includes as a physically relatively small part thereof, the whole of Figure III shielded source assembly 24. This Figure V assembly comprises a cylindrical housing 27 with mounting feet 28 and a beta ray permeable window 29. The housing 27 is formed of material and thickness sufficient as a shield for the beta rays, and has a generally rectangular wall cut-out portion 30, covered by the window 29 as a thin, stainless steel, beta ray permeable member.

Within the Figure V housing 27, a generally cylindrical support member 31 is mounted lengthwise of the housing 27 for adjustment rotation about a longitudinal axis which is parallel, if not coincident with the longitudinal axes of both the housing 27 and the support member 31. Lengthwise of and on the support member 31, a flat mounting face 32 is provided, and the entire source assembly of Figure III is secured to this face, by means of the bracket feet 26, so as to extend lengthwise of the support 31 and the housing 27 and parallel with the longitudinal axes of both. Since the window 29 also extends lengthwise of the housing 27, it will be seen that the beta ray source assembly 24 may be presented to the window 29 or moved away therefrom, by rotary adjustment of the support member 31. This assembly thus has double window protection, i.e., the outer window 29 and the source tube 12 which is in itself a beta ray window. The support member 31 is mounted on end pivot bosses 32 and 33, and the right hand boss 33 is extended through the end wall of the housing 27, with a knurled knob 34 secured thereto as a means of adjustably rotating the support 31 and the gaseous beta ray source assembly 24 mounted thereon. The fill tube 22 for the tube 12 is extended axially through the support 31 and out through the boss 33 so that the adjustment rotation of the device does not bend the fill tube. As particularly shown in Figure VI, the support member 31 is provided with detent holes 35 and 36 in 90° radial arc relation with each other. In the housing 27, a detent screw 37 is mounted for cooperation with the detent holes 35 and 36. In this manner the beta ray source assembly is either held in operative relation to the window 29 of the housing 27, or is held in inoperative position, rotated away from the window 29 and shielded by the wall of the housing 27.

The Figure VII sectional showing illustrates a beta ray source assembly which is an alternate structure closely similar to that of Figures V and VI. In the Figure VII structure however, there are two sub-assembly source units side by side, each like that of Figure III, instead of the single such unit shown in Figures V and VI. The Figure VII window 29' and housing cut-out opening 30' are larger than their counterparts in Figures V and VI, in order to encompass both of the Figure VII sources 24 and 24'. The Figure VII structure is an illustration of the simplicity of source size variance of the device according to this invention.

The alternate structure of Figures VIII and IX is similar to that of Figures V and VI except that a movable shielding shutter 38 is provided for closing off a window 29' when desired. The Figure VIII housing 27' encloses a generally cylindrical support 31' on which the gaseous source assembly 24 is mounted in operative alignment with the housing window opening 30'. The support 31' is fixed against rotation by a locating screw 39 extending through the housing 27' and into the support 31'. At each end of the housing 27' and arcuate shutter adjustment slot is provided, as at 40, 41. As in Figure IX, a threaded pin 42 extends from the shutter 38 through the slot 41, with a releasable nut 43 thereon to bind the shutter 38 to the inner wall of the housing 27' to hold the shutter in its adjusted position. A similar arrangement is provided with respect to the slot 40. The shutter 38 is curved to conform to the inner wall of the housing 27' and slides therealong, when being adjusted, as indicated in dotted lines in Figure IX, to close off the housing opening 30' and shield off the beta ray source 24.

Figures X–XV inclusive illustrate structures for "spot" beta ray sources according to this invention. That is, these are small area gaseous sources. As in Figures X and XI they comprise a cup-like housing 44 of beta ray shielding material, and a beta ray permeable window 45. In this instance the unit is filled with krypton 85 gas through a pipe 46, entering through the side wall of the cup. For reasons of assembly or manufacture the filling tube may be entered through the bottom of the cup as indicated at 46' in Figures XII and XIII. These figures show a housing cup 44' and a beta ray window 45' thereon. The showing of Figures XIV and XV is the same as that of Figures X and XI except that the beta ray window 45" is formed with circular convolutions to give a factor of flexibility to the window so that krypton may change in volume under atmospheric changes without harm to this unit. The supply pipes in these Figures XI–XIV structures may be pinched off and sealed according to the teaching in regard to Figures I and II, or these supply pipes may be connected to supply, relief, or control arrangements as desired and according to the following teaching in regard to Figures XVI–XVIII.

The following structure combinations in Figures XVI–XVIII each include by way of illustration, the gas tube source of Figures I and II. It is intended however, that any desired assembly combinations of this gas tube source may be substituted for the simple gas tube source shown in Figures XVI–XVIII. For example, any of the assemblies of Figures III, V, and VIII may be so substituted.

The Figure XVI combination illustrates a source system and source filling method and comprises the gaseous source unit 10, with the fill tube 22 extending therefrom and leading to a gas supply chamber 47 surrounded by a supply cooling chamber 47' and to a vacuum pump 48 as directed by a manual two way valve 49 which is arranged to (1) connect the source unit 10 to the vacuum pump 48 while shutting off the supply and (2) connect the source unit 10 to the supply chamber 47 as a means of filling the source unit with gas as desired. Thus the gas source may be readily adjusted either during manufacture or during set-up or operation. The radiation from the unit 10 may be measured in a system like that of Figure I while the unit 10 is thus being filled, and the pipe 22 pinched off at 22' when the desired strength is reached. If too much gas is put in the unit 10, the supply chamber is cooled down, by carbon dioxide for example, to draw some of the gas from the unit 10, and then the pipe 22 is pinched off.

The Figure XVII combination comprises the gaseous source unit 10, with the fill tube 22 extending therefrom and sealed off at 23, but also extending to spring loaded bellows unit 50. One end of the bellows is fixed as at 51 and the other end is movable by means of an adjustment screw 52. Thus the gas density in the source unit 10 may be varied by adjustment of the bellows. In this manner the amount of beta radiation from the gas source 10 may be adjustably varied as desired.

The Figure XVIII combination is like that of Figure XVII except that a coil spring 53 is substituted for the Figure XVII adjustment screw 52. Thus the gas source 10 is arranged for automatic compensation of density variance within the gas source 10 under the influence of temperature change, for example.

A further advantage of this invention is demonstrated by Figure XIX, which illustrates a further source filling method. With this arrangement many gaseous source units 54, each like the Figure I source unit 12 or the described variations thereof, may be simultaneously filled from a radio-active gas supply chamber 55. According to this arrangement and method, a fill tube 56 is connected to the supply chamber 55, and the source units 54 are each separately connected to the fill tube 56 by connection pipes 57. A vacuum pump 58 is also connected to the fill pipe 56, through a pipe 59. A vacuum pump shut off valve 60 is located in the pipe 59, and a supply shut off valve 61 is located in the fill pipe 56 adjacent to the supply chamber 55. The outer end of the fill pipe 56 is closed off, and thus a closed system may be provided by closing the supply valve 61. This system is first evacuated to a practical degree and then the vacuum pump valve 60 is closed. Then the supply valve 61 is opened and the source units 54 filled with gas. Suitable radiation measuring devices are provided for each source unit, of the nature and in the general manner illustrated in Figure I. As each source unit is filled to strength, its connecting pipe 57 is pinched off at 57'. A cooling system 62 is provided, for removing gas from the sources 54, as desired. The system 62 surrounds the supply chamber 55 and uses a coolant such as carbon dioxide.

This invention, therefore, provides a new and improved radio-active gauging source device.

As many embodiments may be made of the above invention and as changes may be made in the embodiments set forth above, without departing from the scope of the invention, it is to be understood that all matter hereinbefore set forth or shown in the accompanying drawings is to be interpreted as illustrative only and not in a limiting sense.

I claim:

A radio-active gaseous gauging source device for emitting ionization radiations for use in a gauging function outside of said device, said device comprising a first cylindrical sleeve housing having a pair of mounting legs thereon and formed of shielding material for preventing the passage therethrough of said radiations, a thin stainless steel window in said housing and permeable to said radiations, a support body in said housing, formed as a cylinder with a flat side lengthwise thereof, said body being end mounted in said housing for rotation therein on its longitudinal axis as coincident with the longitudinal axis of said cylindrical housing, and being of substantially less diameter than the inner wall of said housing sleeve, a second, much smaller sleeve housing mounted on said support body flat side in spaced relation therewith and parallel with said first housing and said support body, said second sleeve being formed of shielding material with respect to said radiations and having a window opening therein for the passage therethrough of said radiations, said window opening extending essentially the length of said second sleeve as a straight slot therein in the outside of said second sleeve with respect to said support body, a radio-active gas filled tube mounted in snug fitting and shape and size conforming relation in and with respect to the inner wall of said second sleeve, said tube being formed of thin stainless steel permeable to said radiations, means for manually rotating said support body within said first sleeve housing to bring said second sleeve window into and out of coincidence with said first sleeve window, and a bolt and socket arrangement between said first sleeve housing and said support body for securing said support body in positions of coincidence and non-coincidence of said windows.

References Cited in the file of this patent

UNITED STATES PATENTS

| | | |
|---|---|---|
| 1,651,308 | Winkelmann | Nov. 29, 1927 |
| 2,354,786 | Wall | Aug. 1, 1944 |
| 2,552,050 | Linder | May 8, 1951 |
| 2,576,100 | Brown | Nov. 27, 1951 |
| 2,790,945 | Chope | Apr. 30, 1957 |

OTHER REFERENCES

Proceedings of the International Conference on the Peaceful Uses of Atomic Energy, vol. 14, August 20, 1955, pages 85 to 88.